US006953896B2

(12) United States Patent
Kleeberger et al.

(10) Patent No.: US 6,953,896 B2
(45) Date of Patent: Oct. 11, 2005

(54) CABLE SUPPORT DEVICE FOR RACK-MOUNTED EQUIPMENT AND THE LIKE

(75) Inventors: Terry M. Kleeberger, Tacoma, WA (US); Paul W. Robinson, Bainbridge Island, WA (US); Billie D. Eliot, Redmond, WA (US); Daniel J. Bagby, Enumclaw, WA (US)

(73) Assignee: Carlyle, Inc., Tukwila, WA (US)

( * ) Notice: Subject to any disclaimer, the term of this patent is extended or adjusted under 35 U.S.C. 154(b) by 0 days.

(21) Appl. No.: 10/837,524

(22) Filed: Apr. 29, 2004

(65) Prior Publication Data

US 2004/0262024 A1 Dec. 30, 2004

Related U.S. Application Data

(60) Provisional application No. 60/466,759, filed on Apr. 29, 2003.

(51) Int. Cl.[7] .................................................. H02G 3/04

(52) U.S. Cl. ................... 174/72 A; 174/68.1; 211/60.1; 211/118; 248/49; 361/825

(58) Field of Search ................................ 174/48, 65 G, 174/68.1, 69, 72 A, 99 R, 99 E, 100, 101; 211/60.1, 61, 118; 248/49; 361/615, 825–828, 832; 385/134, 135

(56) References Cited

U.S. PATENT DOCUMENTS

| | | | | |
|---|---|---|---|---|
| 1,764,630 A | * | 6/1930 | Houts | 248/49 |
| 5,433,322 A | * | 7/1995 | Williams | 206/443 |
| 6,127,631 A | * | 10/2000 | Green et al. | 174/72 A |
| 6,256,443 B1 | * | 7/2001 | Uruno et al. | 385/134 |
| 6,373,721 B2 | * | 4/2002 | Lecinski et al. | 361/826 |
| 6,396,992 B1 | * | 5/2002 | Debal | 385/135 |
| 6,489,565 B1 | | 12/2002 | Krietzman et al. | |
| 6,522,551 B2 | * | 2/2003 | Hsu et al. | 361/752 |
| 6,568,542 B1 | * | 5/2003 | Chen | 211/26 |
| 6,600,106 B2 | * | 7/2003 | Standish et al. | 174/68.3 |
| 6,686,541 B2 | | 2/2004 | Chan | |
| 6,706,969 B1 | * | 3/2004 | Young | 174/95 |
| 6,742,746 B1 | * | 6/2004 | La Scola et al. | 248/49 |

FOREIGN PATENT DOCUMENTS

| | | | | |
|---|---|---|---|---|
| EP | 542368 A1 | * | 5/1993 | F16L/3/22 |

* cited by examiner

*Primary Examiner*—Dean A. Reichard
*Assistant Examiner*—Adolfo Nino
(74) *Attorney, Agent, or Firm*—Stoel Rives LLP

(57) ABSTRACT

A cable support device for use in combination with equipment to which multiple electrical and/or fiber-optic cables are connected, such as computer or telecommunications equipment, comprises a frame and one or more cable-support bars. The cable support bars are typically aligned in generally parallel relation proximal to a connector panel of the equipment for supporting the cables. A first end of each bar is slidably supported by the frame for movement from a closed position spanning across the connector panel, toward an open position affording access to the equipment. When in the closed position, a second end of each bar is preferably engaged in a bracket of the frame, which provides added support for the bar and prevents inadvertent opening thereof.

20 Claims, 3 Drawing Sheets

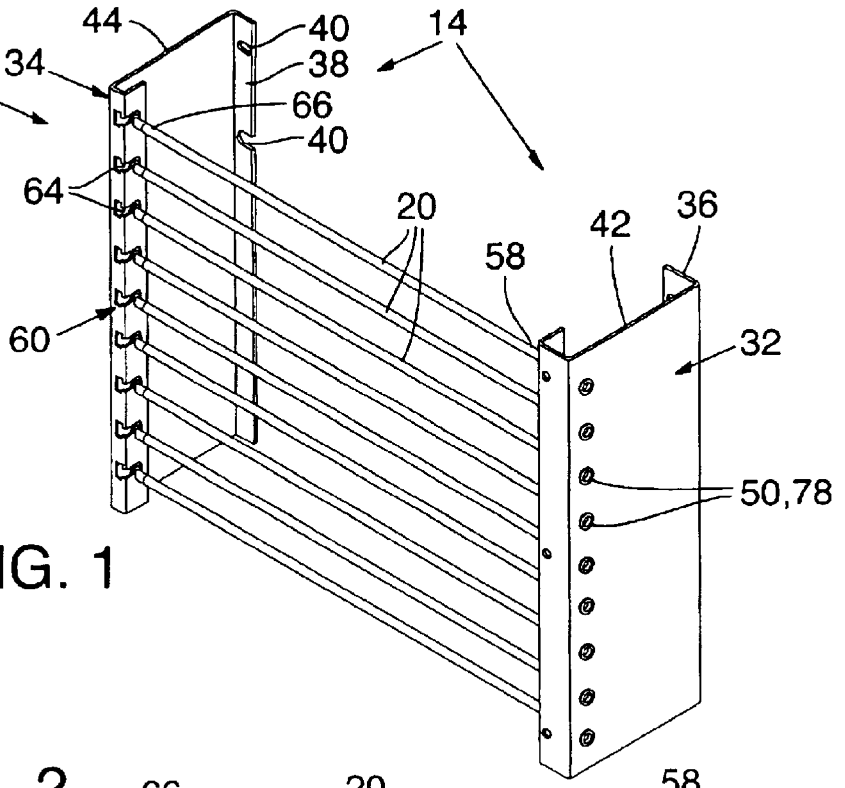
FIG. 1
FIG. 2
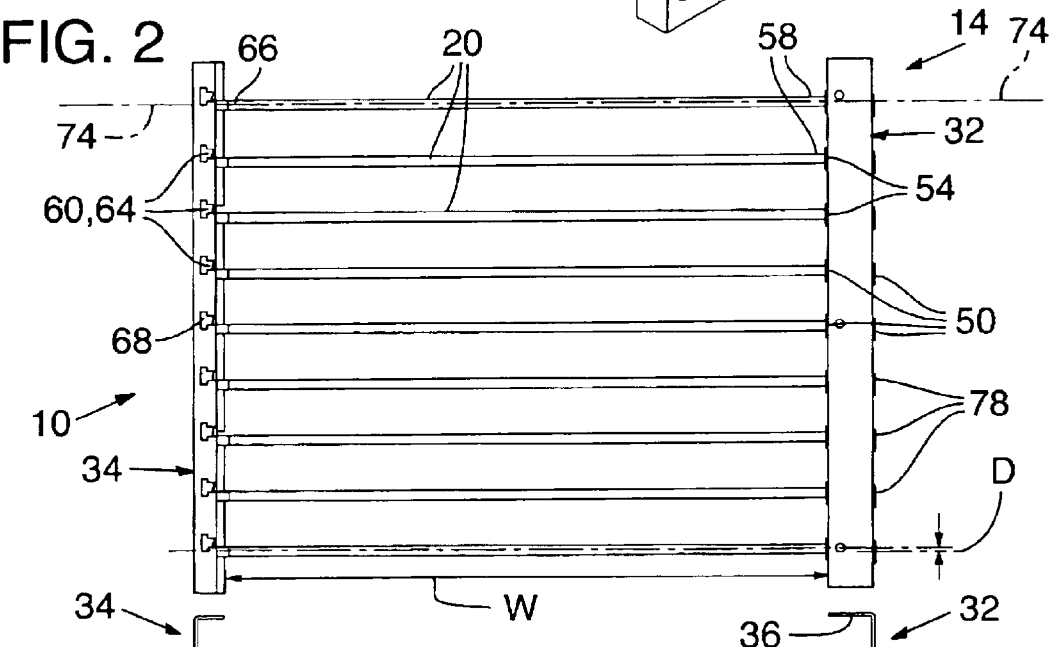
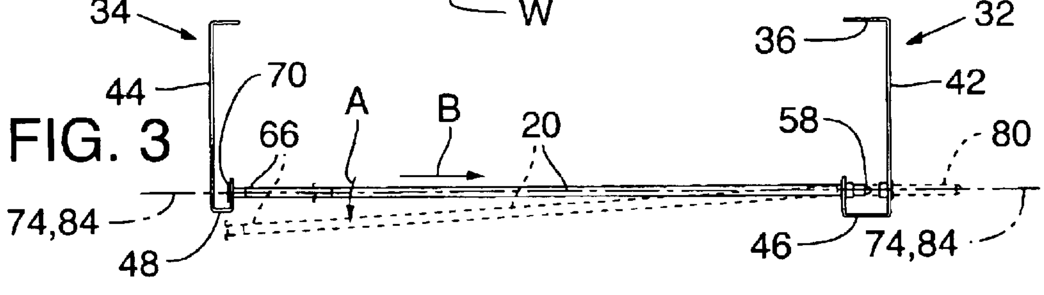
FIG. 3

CABLE SUPPORT DEVICE FOR RACK-MOUNTED EQUIPMENT AND THE LIKE

RELATED APPLICATIONS

This application claims the benefit under 35 U.S.C. §119 (e) of U.S. Provisional Patent Application No. 60/466,759, filed Apr. 29, 2003, which is incorporated herein by reference.

TECHNICAL FIELD

This application relates to cable support devices, particularly devices for supporting electrical and fiber-optic cables emanating from rack-mounted computer and telecommunications equipment such as switches, concentrators, routers, and servers, for example.

BACKGROUND

Network switches and other computer and telecommunications equipment are commonly stacked in a floor-standing metal chassis or along a backplane. The units of equipment may be stacked in a vertical direction or a horizontal direction. Each piece of equipment may have multiple ports, typically in the form of plug or socket connectors arranged on a connector panel of the equipment. For example, each unit of equipment in the stack may include 48 socket connectors of the RJ-45 or RJ-11 type, arranged in a compact array in groups of six or twelve. Connector panels may have any of a variety of other port layouts and connector types and quantities, from a single port to many dozens of ports.

It is known to provide support structures adjacent the connector panel of an equipment stack for organizing the many cables emanating from the ports, to help avoid tangles and prevent damage or inadvertent disconnection. Most known cable support devices comprise rigid structures that are not adjustable.

U.S. Pat. No. 6,686,541 of Chan discloses an adjustable cable management device including a cable channel that is rotatably mounted, via a bracket, to a surface such as an equipment enclosure rail. The cable channel can be manually rotated on the bracket to allow service access to an area of the equipment enclosure normally covered by the cable channel. When the cable channel is rotated, it may tend to subject the cables to bending and tension forces, which may increase the risk of cable and connection failure.

The present inventors have recognized a need for an improved cable support device.

BRIEF DESCRIPTION OF THE DRAWINGS

FIG. 1 is an isometric view of a cable support rack in accordance with a preferred embodiment;

FIG. 2 is an elevation view of the cable support rack of FIG. 1;

FIG. 3 is a top plan view of the cable support rack of FIG. 1, the broken lines illustrating how a support bar of the cable support rack is disengaged from a hangar bracket of the rack and slidably retracted away from the hangar bracket;

DETAILED DESCRIPTION OF PREFERRED EMBODIMENTS

FIGS. 1–3 are respective isometric, elevation, and plan views of a cable support rack 10 in accordance with a preferred embodiment. With reference to FIGS. 1–3, cable support rack 10 includes a frame 14 supporting multiple cable support bars 20 in spaced-apart, generally parallel relation. Cable support bars 20 are preferably oriented horizontally and spaced apart along a vertical plane, as depicted in FIGS. 1–3. However, in alternative embodiments, cable support bars 20 may be oriented vertically and spaced apart at horizontal intervals, or oriented in another configuration.

Figure 4:
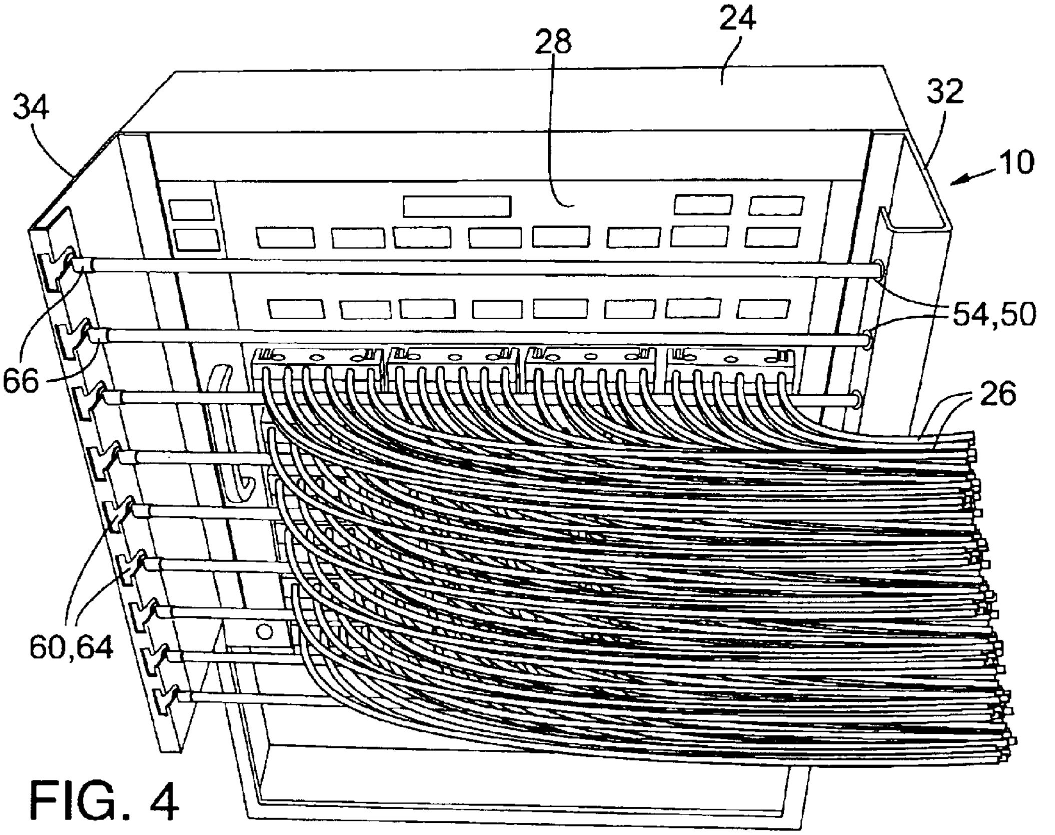
FIG. 4 is a pictorial view of the cable support rack of FIG. 1 in use with computer network equipment in an equipment rack.

FIG. 4 is a perspective view of support rack 10 in use with a stack of equipment 24 for supporting multiple electrical and/or fiber-optic cables 26 connected to a connector panel 28 of equipment 24. Equipment 24 may typically include computer and/or telecommunications equipment, such as switches, routers, servers, concentrators, and the like. Equipment 24 may also comprise other kinds of equipment to which wires and/or cables are connected, such as audio equipment, video equipment, broadcasting equipment, patch panels, test-and-measurement equipment, and any other kind of equipment that includes a connector panel to which electrical and/or fiber-optic cables are connected. Equipment 24 may include a stack of equipment units (such as "blades"), which are stacked in a vertical or horizontal stack.

With reference to FIGS. 1–4, frame 14 includes first and second sections 32 and 34, respectively, spaced apart a distance "W" (FIG. 2) approximately corresponding to the width of connector panel 28 (FIG. 4). Sections 32 and 34 of frame 14 are preferably formed of sheet metal, bent and punched to improve structural rigidity and to provide mounting surfaces, guideways, and brackets, as detailed below. In alternative embodiments (not shown), frame 14 may be formed of materials other than sheet metal and in other configurations. For example, frames, guideways, brackets and mounting surfaces may be formed of plastic, composites, metal wires, or machined metal parts. Sections 32 and 34 may also be made as part of a unitary or composite structure with a chassis, cabinet, or other structural members bridging distance W.

In the preferred embodiment, frame sections 32 and 34 include mounting flanges 36 and 38, respectively, which include mounting holes or slots 40 for attaching frame sections 32 and 34 to equipment 24 or to a chassis (not shown), which may also support equipment 24. The frame sections 32 and 34 further include opposing outwardly-extending walls 42 and 44 that provide spacing between bars 20 and equipment 24. Walls 42 and 44 are folded back over themselves along their outer margins to form U-shaped regions 46 and 48, which have enhanced strength and rigidity and provide a platform for brackets and guides for supporting bars 20 thereon, as described below.

A set of guides 50 are provided in U-shaped region 46 of first frame section 32. Guides 50 include a plurality of primary guide holes 54, spaced apart along first frame section 32 for supporting bars 20 at their first ends 58. Second frame section 34 includes a bracket 60 along its outer margin, including a plurality of slots 64 formed therein for supporting a second end 66 of bars 20 when bars 20 are in a closed position, as shown in FIGS. 1, 2, and 4. Slots 64 include enlarged, T-shaped openings 68 sized to receive and engage an oversized head 70 of each bar 20, to thereby prevent bars 20 from being inadvertently moved along their longitudinal axes 74. Primary guide holes 54 and slots 64 are aligned at like intervals so that they cooperate to support the bars 20 in a horizontal orientation and spaced apart at vertical intervals along a vertical plane generally parallel to connector panel 28. The spacing intervals preferably correspond to the thickness of the units in the stack of equipment 24 so that the cables 26 connected to a particular unit in the stack are supported on their own bar 20. This arrangement relieves the equipment's ports 90 (FIG. 5) and cable connectors from the stress of downward pulling force otherwise imparted by the weight of the cables 26. Providing a bar 20 for each unit of equipment in the stack 24 also provides a resting place for the cables 26 of each unit, so that when a unit is disconnected from its cables 26 and pulled from the stack for replacement, the weight of the disconnected cables is prevented from being transferred to the cables and ports below. Bars 20 also maintain a spacing between groups of cables 26, in the vicinity of connector panel 28, which may facilitate service and removal of units in the stack of equipment 24. Thus, cable support rack 10 significantly reduces the risk of mechanical failure of equipment 24, its ports 90 (FIG. 5), and the cables 26, reduces downtime of equipment 24, and improves utilization. Bars 20 also help to maintain the organization of cables 26 to facilitate reconnection of cables 20 upon replacement of a unit of equipment in the stack 24.

Bars 20 span between first and second sections 32 and 34 of frame 14 when in the closed position, as shown in FIGS. 1, 2, and 4, but are slidably supported by guides 50 to allow bars 20 to be slidably retracted toward an open position (FIG. 5) to facilitate access to equipment 24. For example, to retract second end 66 of bars 20 from second section 34 of frame 14, the oversized head 70 is first disengaged from slot 64 by moving second end 66 outwardly in direction "A" (FIG. 3), followed by sliding of bar 20 in lateral direction "B", wherein direction A is different from direction B and generally transverse thereto. Sliding of bars 20 in direction B involves movement of each bar 20 along its longitudinal axis 74. Bars 20 are preferably movable independently, but may optionally be grouped together by a coupling member (not shown) for opening and closing bars 20 in tandem.

Guides 50 include a set of secondary guide holes 78 spaced apart from the set of primary guide holes 54. Secondary guide holes 78 are spaced apart from each other at intervals such that primary and secondary guide holes 78 and 54 are grouped in pairs. When bars 20 are moved laterally toward the open position, first end 58 of bar 20 is threaded through its secondary guide hole 78, as depicted by phantom lines 80 of FIG. 3. In this arrangement, both of the pair of primary and secondary guide holes 54 and 78 provide support for bar 20, to thereby prevent its second end 66 from flopping outwardly or downwardly relative to frame 14 and to provide support for cables 26 when bar 20 is in the open position. Secondary guide holes 78 are preferably offset relative to a line 84 intersecting primary guide hole 54 and slot 64 (line 84 is coincident with longitudinal axis 74 of bars 20 when in the closed position)—i.e., secondary guide holes 78 are preferably shifted a slight distance "D" (FIG. 2) relative to primary guide holes 54, and preferably approximately $1/16$ inch below line 84. Offsetting secondary guide holes 78 causes bars 20 to be held at a slight incline when moved to the open position, which tends to offset a cantilever bending deflection of second ends 66 that is expected to occur under the load of cables 26. Primary and secondary guide holes 54 and 78 are preferably lined with plastic grommets 88 (FIG. 5) to reduce friction and provide a sliding fit for bars 20.

Figure 5:
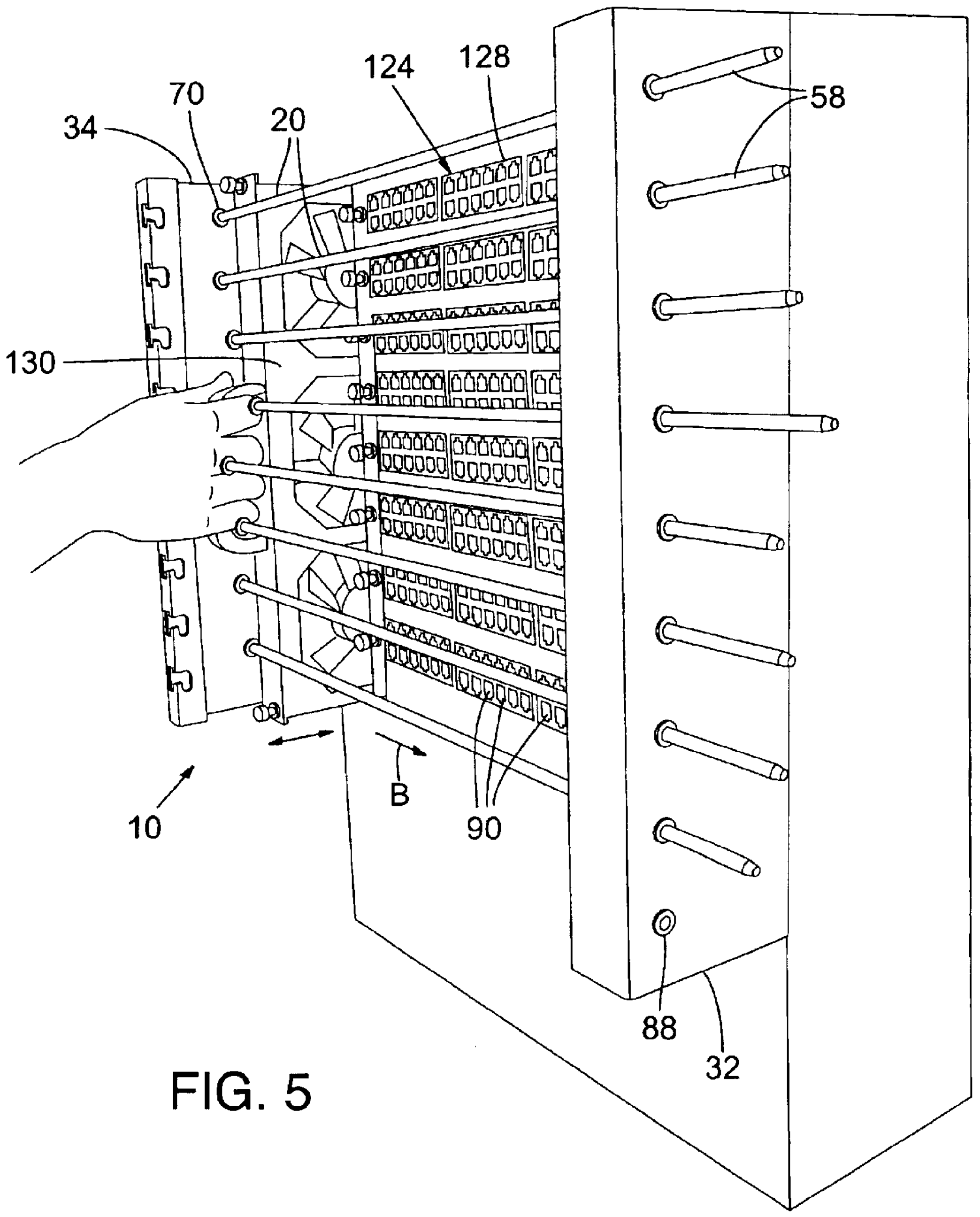
FIG. 5 is a pictorial view of the cable support rack of FIG. 4 (cabling omitted), shown with the support bars retracted to allow a cooling fan module to be slidably removed from the equipment rack.

FIG. 5 is a perspective view of cable support rack 10 installed adjacent a connector panel 128 of an Ethernet switch 124. In FIG. 5, cables 26 are omitted for clarity. FIG. 5 depicts bars 20 slidably moved in direction B to the open position, to allow manual access to Ethernet switch equipment 124 and, in particular, to allow replacement and servicing of a transverse fan module 130 of the type included with widely-used Series 4000, 5000, and 6000 Ethernet switches sold by Cisco Systems, Inc., San Jose, Calif., USA.

Figure 6:
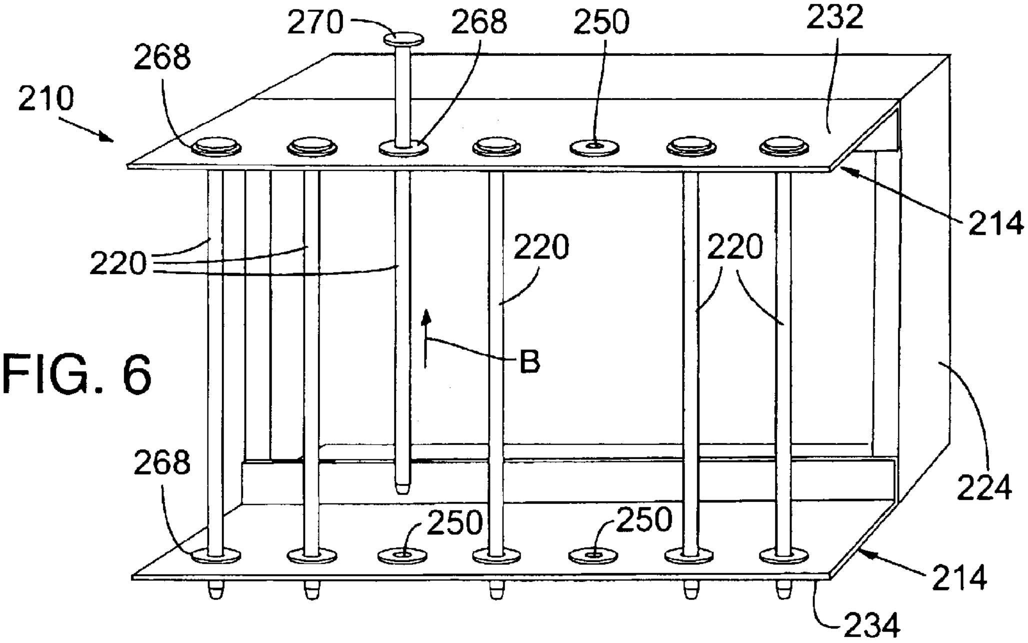
FIG. 6 is an isometric view of a vertical cable support rack in accordance with an alternative embodiment.

FIG. 6 is an isometric view of a vertical cable support rack 210 in accordance with an alternative embodiment useful with equipment 224 stacked in a horizontal stack. With reference to FIG. 6, rack 210 includes a frame 214 including an upper frame portion 232 and a lower frame portion 234. Upper and lower frame portions 232 and 234 include a plurality of guide holes 250 spaced apart therealong in alignment for holding multiple cable support bars 220 in a vertical orientation and spaced apart in a horizontal direction. Each cable support bar is provided with a sliding friction collar 268, which is adjusted along the length of bar 220 after or concurrently with upward movement of bar 220 in direction B, to thereby retain bar 220 in an open position. Collars 268 may be frictionally coupled to bars 220 and not to upper frame portion 234, so that they may be manually adjusted when desired. Alternatively, collars 268 may be secured in holes 250 of upper frame portion 234. Heads 270 of bars 220 are oversized to provide a stop that limits the downward motion of bars 220.

It will be obvious to those having skill in the art that many changes may be made to the details of the above-described embodiments without departing from the underlying principles of the invention. The scope of the present invention should, therefore, be determined only by the following claims.

What is claimed is:

1. A cable support device for use in combination with equipment to which multiple electrical or fiber-optic cables, or both, are connected, comprising:

a frame, including first and second frame sections spaced apart and located in the vicinity of a connector panel of the equipment; and a plurality of elongate cable support bars extending between the first and second frame sections and spaced apart in generally parallel relation therealong, each of the cable support bars being slidably supported by the first frame section to facilitate sliding movement of the cable support bar along its longitudinal axis from a closed position, wherein the cable support bar spans between the first and second frame sections, toward an open position, wherein the cable support bar is retracted from the second frame section to thereby facilitate access to the equipment.

2. The device of claim 1, wherein the cable support bars are horizontally oriented.

3. The device of claim 1, wherein the cable support bars are vertically oriented.

4. The device of claim 1, wherein:

each of the cable support bars includes an oversized head an end of the cable support bar nearest the second frame section; and the second frame section includes a bracket having a plurality of slots spaced apart and sized to receive and engage the oversized heads of the cable support bars when the cable support bars are in the closed position.

5. The device of claim 4, wherein the oversized heads and the slots cooperate when the cable support bars are in the closed position, to prevent the cable support bar from being moved in the first direction.

6. The device of claim 5, wherein the slots are T-shaped so that the cable support bars are disengaged from the slots by moving the second end of the cable support bars in a second direction different from the first direction.

7. The device of claim 1, wherein the first frame section includes, for each cable support bar, a pair of guide holes spaced apart in the first direction, each pair of guide holes adapted to receive and orient one of the cable support bars relative to the frame when said cable support bar is moved toward the open position.

8. The device of claim 7, wherein:

in the closed position, each of the cable support bars is supported near its first end in one of the guide holes; and in the open position, each of the cable support bars is slidably supported in both guide holes of the corresponding pair of guide holes.

9. The device of claim 8, wherein the second guide hole is offset from a line intersecting first guide hole and the slot.

10. A cable support device for use in combination with equipment to which multiple electrical or fiber-optic cables, or both, are connected, comprising:

a plurality of elongate bars spaced apart in generally parallel relation in proximity to a connector panel of the equipment, each of the elongate bars having a longitudinal axis; and a frame means for slidably supporting the bars for movement along their longitudinal axes from a closed position, wherein the bars extend across substantially the entire connector panel, toward an open position, wherein at least one of the bars is at least partially retracted to thereby facilitate access to the equipment.

11. The device of claim 10, wherein the frame means includes first and second frame sections spaced apart adjacent the connector panel.

12. The device of claim 11, wherein:

the bars span between the first and second frame sections when in the closed position, and at least one of the bars is at least partially retracted from the second frame section when in the open position, to thereby facilitate access to the equipment.

13. The device of claim 10, wherein the frame means includes means for supporting the bars in a horizontal orientation.

14. The device of claim 10, wherein the frame means includes means for supporting the bars in a vertical orientation.

15. The device of claim 10, further comprising means for releasably retaining the bars in the closed position to prevent inadvertent opening thereof.

16. The device of claim 10, further comprising guide means, operable when the bars are in the open position, for slidably guiding the bars along their longitudinal axes and preventing significant angular deflection of the bars relative to the closed position.

17. The device of claim 16, wherein the guide means includes an offset guide means that supports the bars when in the open position in an orientation that offsets a cantilever deflection of the bars caused by a cable load on the bars.

18. A cable support device for use in combination with computer or telecommunications equipment, comprising:

a frame located in the vicinity of a connector panel of the computer or telecommunications equipment; and an elongate cable support bar supported by the frame for sliding movement of the cable support bar along its longitudinal axis from a closed position, wherein the cable support bar spans across the connector panel, toward an open position, wherein the cable support bar is retracted at least partially along the connector panel, to thereby allow manual access to the computer or telecommunications equipment.

19. The device of claim 18, further comprising guide means, operable when the bar is in the open position, for slidably guiding the cable support bar along its longitudinal axes and preventing significant angular deflection of the bar relative to the closed position.

20. The device of claim 18, further comprising means for releasably retaining the bar in the closed position to prevent inadvertent opening thereof.

* * * * *